United States Patent [19]
Penaranda et al.

[11] Patent Number: 5,810,472
[45] Date of Patent: Sep. 22, 1998

[54] HAND BLENDER FOR MIXING OR COMMINUTING FOODSTUFFS WITH AN AIR SUPPLY STRUCTURE

[75] Inventors: Mariano Penaranda; Josep M. Masip, both of Barcelona; Robert Rafols, Fost de Campcentelles; Xavier Cuesta, Barcelona, all of Spain; Conrad Berghammer, Wiesbaden, Germany

[73] Assignee: Braun Aktiengesellschaft, Frankfurt, Germany

[21] Appl. No.: 900,023

[22] Filed: Jul. 24, 1997

Related U.S. Application Data

[63] Continuation of PCT/EP96/00478, Feb. 6, 1996, abandoned.

[30] Foreign Application Priority Data

Feb. 13, 1995 [DE] Germany ......................... 195 04 638.2

[51] Int. Cl.$^6$ ............................ A47J 43/044; A47J 43/07
[52] U.S. Cl. ............................................ 366/129; 220/601
[58] Field of Search .................................... 366/129, 130, 366/342, 343, 331; 220/601; 261/93; 99/348; 416/63, 244 R

[56] References Cited

U.S. PATENT DOCUMENTS

| | | | |
|---|---|---|---|
| 1,867,032 | 7/1932 | Smith | ........................................ 220/601 |
| 3,299,924 | 1/1967 | Hanschitz | .............................. 366/129 X |
| 4,850,699 | 7/1989 | Rebordosa | ............................ 366/331 X |
| 5,265,755 | 11/1993 | McArthur, Jr. et al. | .................. 220/301 |
| 5,366,286 | 11/1994 | Ruttimann | ............................ 366/331 X |
| 5,368,384 | 11/1994 | Duncan et al. | ........................... 366/129 |

FOREIGN PATENT DOCUMENTS

| | | | |
|---|---|---|---|
| 0 043 773 | 1/1982 | European Pat. Off. | |
| 0 071 496 | 2/1983 | European Pat. Off. | |
| 0 529 287 | 3/1993 | European Pat. Off. | |
| 1146307 | 11/1957 | France | ..................................... 220/601 |
| 1170120 | 5/1964 | Germany | ............................... 366/129 |
| 25 53 511 | 6/1976 | Germany | . |
| 351375 | 2/1961 | Switzerland | . |
| 6313 | of 1903 | United Kingdom | .................... 220/601 |
| 2213399 | 8/1989 | United Kingdom | .................... 366/129 |

*Primary Examiner*—Charles E. Cooley
*Attorney, Agent, or Firm*—Fish & Richardson P.C.

[57] ABSTRACT

A hand blender powered by an electric motor, for mixing or comminuting foodstuffs in a container, includes a working shaft having an output end, a processing tool attached to the output end of the working shaft, a shaft housing which carries the working shaft, and a bell-shaped casing enclosing the processing tool. The bell-shaped casing has a lower chamber, a lower end bounded by an aperture, and a plurality of lateral openings for the discharge of foodstuffs. A cover plate within the bell-shaped casing forms a fluid-tight seal between the lower chamber and an inner chamber of the shaft housing. The hand blender also includes an air supply structure through which outside air is supplied to the lower chamber of the bell-shaped casing when the bell-shaped casing is immersed in the foodstuffs. The air supply structure includes a flow channel with an inlet side which communicates with the outside air and an outlet side which communicates with the lower chamber of the bell-shaped casing.

24 Claims, 10 Drawing Sheets

HAND BLENDER FOR MIXING OR COMMINUTING FOODSTUFFS WITH AN AIR SUPPLY STRUCTURE

This is a continuation of International Application PCT/ EP96/00478, with an international filing date of Feb. 06, 1996, now abandoned.

BACKGROUND OF THE INVENTION

This invention relates to a hand blender for mixing or comminuting foodstuffs, and to a container for mixing or comminuting foodstuffs using a hand blender.

A hand blender is known in the art from EP-A2-0 529 287, FIG. 4. This hand blender possesses an elongated, tubular housing portion in which a working shaft spaced from the walls of the housing is rotatably guided. Received in the upper area of the housing is the electric motor which is adapted to be coupled to the working shaft in an either fixed or releasable manner. Arranged at the lower end of this shaft housing in the area of the shaft's output end is a bell-shaped casing whose cross-sectional dimension normal to the axis of the working shaft is such as to enable a cutter blade to be received therein. The bell-shaped casing is closed relative to the tubular housing portion by means of a lid or a cover plate, and the working shaft is carried in this area in a bearing.

Conventionally, such a hand blender is utilized in combination with a container in which the food materials of the most diverse consistencies from solid and viscous to liquid are filled for comminution or mixing. During the comminuting and mixing process, it can be observed that a vacuum builds up inside the bell because the bell is placed on the base of the container with its opening facing down, closing or narrowing the opening. As this occurs, the food materials are ejected through the slots in the bell, but it is not possible for a further supply of food to be drawn in through the opening. Accordingly, a pressure below atmospheric develops in the lower chamber of the bell. To obtain uniform blending and comminuting results, it is therefore necessary for the bell, that is, the appliance, to be moved up and down in a reciprocating motion to enable all food materials to be drawn in through the bell opening to subsequently reach the bite of the cutter blade. Lifting the hand blender requires considerable manual effort because of the vacuum formed between the base of the container and the bell, which necessarily results in handling discomfort. Also the initial breakaway torque occurring during lifting is apt to cause tipping of the container or an accelerated withdrawal of the bell from the materials being mixed. In addition, materials clinging to the operating end, that is, the mixing tool or the cutter blade, may spatter.

SUMMARY OF THE INVENTION

On the basis of the prior art referred to in the foregoing and the set of problems described, it is an object of the present invention to configure a hand blender or a container for a hand blender of the type initially described such as to accomplish improved aeration of the foodstuffs in operation of the processing tool while at the same time any vacuum buildup that may occur in the area of the bell-shaped casing is controllable or does not occur in the first place.

The foregoing object is accomplished for a hand blender and for a container when used in combination with a hand blender. With the first invention, operation of the hand blender causes air to be fed to the lower chamber of the bell-shaped casing and to blend with the food materials. Depending on the amount of air supplied to the lower chamber of the bell-shaped casing, the food materials are mixed with air to a greater or lesser extent. At the same time, any pressure that may develop in the lower chamber as the processing tool rotates to blend the foodstuffs can be controlled by the supply of air, thereby reducing or canceling altogether the suction forces produced between the bell and the base of the container by the rotating processing tool. This facilitates the handling of the appliance without causing the container to be lifted as well when the hand blender is lifted, whereby the container's stable position is lost.

The means for introducing air into the lower chamber of the hand blender may vary. In a first embodiment of the present invention, the hand blender may include a fan device and a flow channel through which air is blown from atmosphere into the lower chamber. In this arrangement, the fan device may be a fan wheel, for example, which is secured to the drive shaft of the processing tool, thus rotating with the processing tool. However, the fan device may also be a fan motor with fan wheel integrated into the hand blender as a separate device and operable independently of the drive motor of the hand blender manually or, alternatively, automatically by an electric control device.

The means for introducing air into the lower chamber consist in that the hand blender and the bell-shaped casing are configured such that during rotation of the hand blender a pressure below atmospheric is produced by the hand blender in the lower chamber, which pressure can be subsequently reduced or eliminated through a flow channel communicating with atmosphere. In this configuration, an elaborate fan device can be dispensed with; yet it can still be added as a supplementary flow accelerator. When food materials are comminuted or pureed, they are aspirated into the lower chamber by the rotating hand blender through the lower aperture of the bell-shaped casing and expelled outwardly through slots provided on the circumference of the bell-shaped casing. As this occurs, a pressure below atmospheric develops in the lower chamber which can be maintained within specified limits or reduced when the lower chamber communicates with atmosphere through a flow channel of variable cross-section, such as a valve. In the process, air from atmosphere enters the lower chamber through the flow channel, mixing with the foodstuffs and producing a puree mixed with air to a greater or lesser extent depending on the quantity of air introduced. At the same time, by the reduction of the pressure below atmospheric in the lower chamber it is possible to diminish the suction force that develops between the bell-shaped casing and the base of a container with the bell-shaped casing sitting on the base.

A flow channel is formed in the housing of the hand blender, through which in operation air can be blown or aspirated into the lower chamber of the bell-shaped casing.

The configuration of a flow channel communicating with atmosphere in the housing of the hand blender enables the lower chamber to be vented automatically, that is, the vacuum present in the lower chamber can be reduced through the flow channel from atmosphere to a greater or lesser extent as desired, so that the air mixes with the food materials, producing an improved pureeing result.

Venting of the bell chamber can be accomplished in a particularly simple manner by providing the flow channel in the working shaft which is formed by a hollow shaft.

The flow channel may incorporate a valve by means of which the supply of air to the lower chamber of the bell-shaped casing is controlled automatically or manually. For one purpose, the valve serves to control the pressure in the lower chamber, and for another purpose to prevent the ingress of foodstuffs in the flow channel. It is advantageous, therefore, for the valve to be arranged in very close proximity to the lower chamber.

The valve opens in dependence upon operation of the appliance, which is accomplished in that the pressure differential residing on the valve causes the valve member to move into its open position.

The valve is arranged in the cover plate separating the lower chamber fillable with food materials from the upper chamber, the upper chamber being required to be free from contaminants. Accordingly, food materials are prevented from entering the flow channel from the lower chamber because the pressure-responsive valve opens only when air enters the lower chamber, as a result of which food materials are kept away from the flow channel.

The valve member can be displaceable both axially and radially relative to the working shaft. Depending on the valve structure, the manner, the operating condition and the parts by means of which such a valve is opened and closed, a slidable body representing a closure member of the flow channel can be utilized, which closes or opens the flow channel by axial displacement relative to the working shaft, while a displacement radial to the working shaft should be possible when it is desired to make use of centrifugal forces for the displacement of such a slidable body.

As valve utilized in combination with the container or, alternatively, in combination with the hand blender, a simple ball valve or disk valve can be employed whose valve member is held closed against the sealing seat of the flow channel by means of a spring, however, it is also possible to use for this purpose a resilient tongue made, for example, of metal or plastic which is automatically biased into a closing position by internal bending forces and opens with pressure building up. Such a spring can at the same time be used for adjusting the opening resistance, different springs or spring biasing forces being used for this purpose.

An arrangement of the valve body affording ease of operation is obtained by a variant in which a slidable part of a bearing is formed between the bell-shaped casing and the shaft housing, which slides automatically or under constraint and opens the connection of the flow channel to the area in the bell-shaped casing.

In a further embodiment, the working shaft is divided into two parts. The two parts are connected with each other by a coupling arrangement, such that coupling members associated with the one and, respectively, the other part of the working shaft interengage and possess guide members which on a radial rotation of the working shaft parts relative to each other effect an axial displacement of the working shaft, causing the length of the working shaft to be increased or reduced to thereby open or close a flow channel with this displacement motion.

Such guide members may be formed by projections on the one coupling member and cam surfaces on the other coupling member. In a simple configuration, the projections are manufactured as pins extending radially to the axis of the working shaft and adapted to fit in a corresponding bore in the working shaft. These pins are then guided on guide surfaces of a sleeve-shaped part which is associated with the other part of the shaft and embraces the shaft part that includes the pins for guiding purposes. In such a configuration, in an initial position the two working shaft parts are held compressed under the pressure of a spiral spring slid onto the working shaft and bearing against a section of the housing.

On start-up of the processing tool, that is, with the rotational frequency increasing, the cam surfaces are guided along the pins by a force component acting axially in the direction of the working shaft, causing the one working shaft part to be displaced relative to the other working shaft part such that the working shaft is in its entirety displaced axially, its length being accordingly increased. With this displacement it is then possible to actuate the valve members which open the flow channel.

Furthermore, the working shaft may be provided with a groove which is displaced with regard to the supply of air to the bell-shaped casing such as to travel over a ring seal, thereby opening this valve. Opening by a valve seal of such a groove can also be accomplished in that the complete bell-shaped casing slidably mounted on the working shaft or on the shaft housing is displaced when it is seated on the base of a mixing container, opening a flow path to atmosphere on displacement.

The user of a processing tool may desire to utilize this processing tool in the conventional manner, that is, without the presence of a fluid connection of the area beneath the bell-shaped casing to atmosphere. To be able to close or shut off the valve in such a mode, the shaft housing is held so as to be rotatable relative to another section of the housing. Relative rotation of these two housing sections enables the setting of various positions in which the valve either opens or remains closed in any operating mode of the appliance. Still further it is possible, for example, by relative rotation of the two housing sections, to select different biasing forces for a spring or a spring part acting against a valve member so that the instant the valve opens and a flow channel is released can be preset.

Finally, an arrangement of the valve body which affords ease of operation and closes well is accomplished by slide valves of the type which operate purely in dependence on the distance traveled, thus enabling ease of adjustment by an operator to obtain a desired pressure in the lower chamber.

The working shaft parts effect automatic closing of the valve by a spring when they are moved into their zero position.

A flap valve can be configured such as to be controllable in response to pressure in one embodiment and mechanically by hand in another embodiment. With the mechanical solution, the diaphragm is connected with an axially movable sliding member, its position determining the cross section of opening of the valve member.

In a second invention, there is however also the possibility of providing a special mixing or comminuting container for use with a hand blender, which includes in its base area a valve which, on the basis of the principle referred to in the foregoing, opens when the pressure in the bell-shaped casing of a hand blender exceeds the predetermined value. The form and size of such a container may be conformed to the hand blender. The vacuum chamber defined between the inner chamber of the bell-shaped casing of a hand blender and the base of the container thus also enables venting to atmosphere through the container.

It is preferable for the valve to be fitted to the base of the container. When such a container is utilized, it is not necessary to modify the hand blender of the first invention to achieve the intended effect. Rather, such a container according to the second invention can be utilized in combination with a variety of commercially available hand blenders which all feature a bell-shaped casing in order to achieve the intended effect of eliminating the vacuum developing beneath the bell-shaped casing.

In order to provide the user with the possibility of adjusting the pressure that may develop beneath the bell-shaped casing, it is preferred to use such a valve or such a valve arrangement that enables the user to adjust the opening resistance prior to or during operation or that operates even automatically.

Further details and features of the present invention will become apparent from the subsequent description of embodiments with reference to the accompanying drawings.

DETAILED DESCRIPTION

Figure 1:
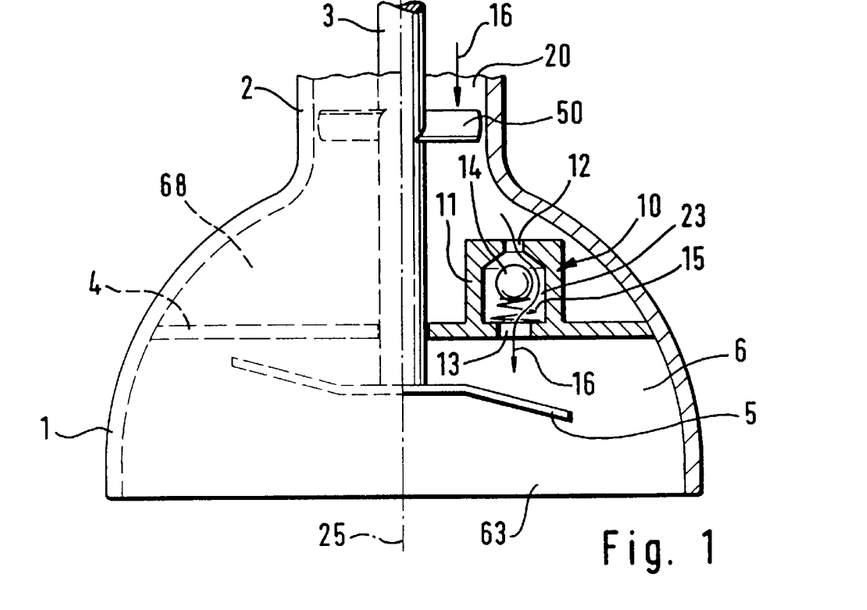
FIG. 1 is a schematic longitudinal sectional view of the lower end of a hand blender of the first invention when in operation, with a valve shown in the open position being provided in the bell-shaped casing thereof.

A hand blender of the type illustrated in FIG. 1 possesses a bell-shaped casing 1 arranged at the end of a shaft housing 2 of which only a fragment is shown in FIG. 1. Extending inside the shaft housing 2 is a working shaft 3. The area in the interior of the bell-shaped casing 1 is covered or sealed relative to the shaft housing 2 by means of a cover plate 4 (shown in section only to the right of the center line), thus preventing food materials that are blended and/or comminuted with this hand blender from entering the shaft housing 2. Attached to the end of the working shaft 3 is a mixing tool or cutter blade 5 which is freely movable in the chamber 6 of the bell-shaped casing 1. The cover plate 4 divides the bell-shaped casing 1 into an upper and a lower chamber 68 and 6, respectively.

Figures 2, 3:
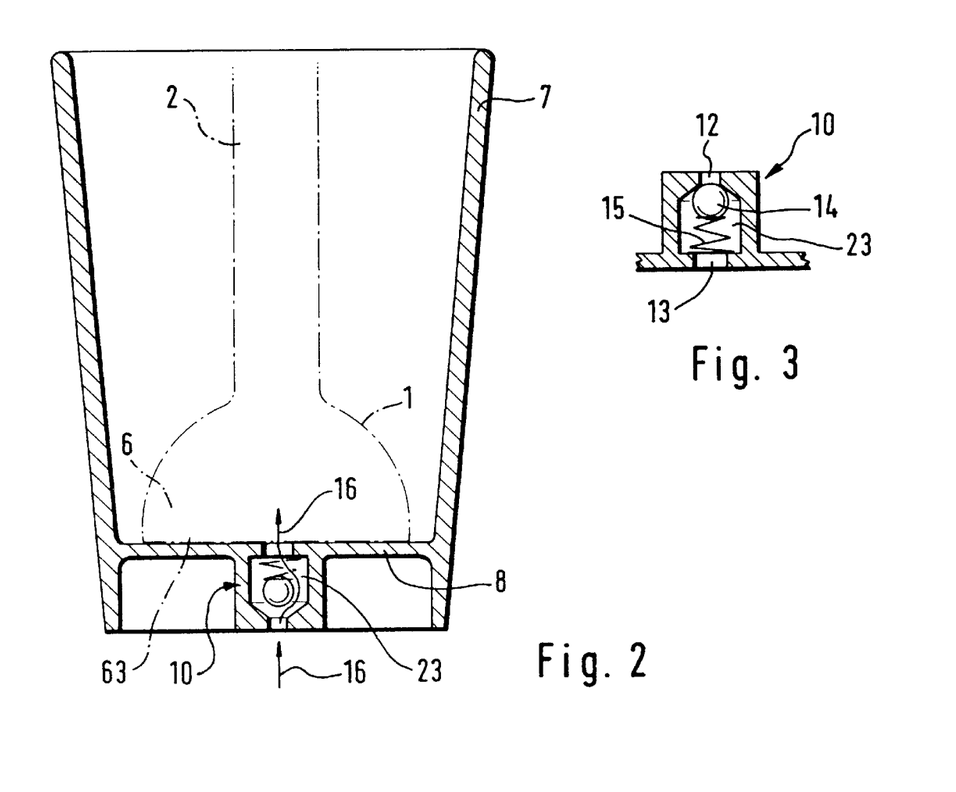
FIG. 2 is a longitudinal section view of a container of a second invention for mixing or comminuting foodstuffs, on the base of which the bell-shaped casing of a hand blender is seated in operation.
FIG. 3 is a view of the valve as illustrated in FIGS. 1 and 2, showing the valve in a closed position.

For mixing and/or comminuting food materials, the hand blender is immersed in a container 7 with its bell-shaped casing 1 as outlined in FIG. 2, processing, that is, mixing or comminuting the materials filled into the container. With the food comminution process proceeding or the consistency of the food items changing, the aperture 63 of the bell-shaped casing 1 becomes sealed relative to the base 8 of such a container 7 so that, also in consequence of the circulation of the materials in the area of the bell-shaped casing 1, a pressure below atmospheric develops in the lower chamber 6 of the bell-shaped casing 1. This may result in inadequate circulation of the materials, preventing the formation of a homogeneously comminuted and blended mass. It is conventional practice to provide slots 9 in the lower area of such a bell-shaped casing 1 as illustrated, for example, in FIGS. 4A and 4B, through which slots the materials to be mixed or comminuted can circulate between the lower chamber 6 and the outside of the bell-shaped casing 1.

Further, in dependence on the materials to be processed it may be advantageous to adjust the pressure below atmospheric in the lower chamber 6 inside the bell-shaped casing 1 to a defined value in order, for example, to be able to cause the materials to dwell in the chamber 6 inside the bell-shaped casing 1 for a specified period. However, the possibility also exists either as an addition or as sole feature that in operation air is urged against the cover plate 4 by means of a fan wheel 50 secured to the working shaft 3.

To accomplish this effect, that is, to avoid any buildup of pressure within the lower chamber 6 on the one hand and, if a pressure below atmospheric is produced in the chamber 6 by the cutter blade 5, to adjust this pressure to a defined value or to have the fan wheel 50 blow a defined quantity of air into the chamber 6 on the other hand, the embodiment of FIG. 1 makes provision for a valve 10 in the cover plate 4, the valve having a valve cage 11 with an inlet opening 12 and an outlet opening 13. Disposed in the interior of the valve cage 11 is a ball 14 which is urged against the inlet opening 12 by means of a spring 15 while closing the outlet opening 13 in a position of rest, that is, when the hand blender is not in operation.

With a pressure below atmospheric developing progressively in the chamber 6 of the bell-shaped casing 1, a suction effect occurs on the outlet opening 13 of the valve cage 11, causing air to be aspirated through the flow channel 23 when the pressure exceeds a specified value, as indicated in FIG. 1 by the flow arrows 16. The instant the valve opens can be preset by suitable selection of the type of spring 15. When the cutter blade 5 produces zero or only very little pressure below atmospheric, the fan wheel 50 then serves as an air generator through which the valve 10 is likewise opened when the pressure above atmospheric in the annular chamber 20 exceeds a specified value.

It is also possible to reduce or eliminate the pressure below atmospheric developing in the chamber 6 of the bell-shaped casing 1 by providing a valve 10 in the base 8 of a mixing container 7 of the type illustrated in FIG. 2, such a valve 10 admitting air into the chamber 6 of the bell-shaped casing 1 sitting on the base 8, as is shown in FIG. 2 equally by the flow arrows which are likewise designated by reference numeral 16. In this embodiment, an additional fan device 50 produces no improvement because the direction of flow is from below to above, being accordingly reversed in contrast to FIG. 1.

As will be apparent, food materials are at no time allowed to enter the shaft housing 2 through the valve 10 of FIG. 1 or to be discharged from the container 7 through the valve 10 in the base 8, because before the valve 10 opens a pressure below atmospheric is built up in the chamber 6 by the rotating cutter blade 5 (see FIG. 1), such that following opening of the valve 10 an air flow towards the chamber 6 is invariably generated, keeping the outlet opening 13 free. As soon as the pressure below atmospheric in the chamber 6 diminishes, the valve 10 is closed as shown in FIG. 3, terminating the supply of air to the chamber 6.

While FIGS. 1 to 3 show a valve 10 with a straightforward structure to explain the principle of the present invention, the further Figures illustrate advantageous configurations in combination with a hand blender which will be explained in the following. In these arrangements it is invariably assumed that a pressure below atmospheric is produced in the chamber 6 by the rotating cutter blade 5. However, it is also possible to utilize a fan device 50 which likewise produces the pressure differential between the upper chamber 68 and the lower chamber 6.

To the extent that the components of the individual embodiments are like or comparable, like reference numerals will be employed so that the explanations relating to the one embodiment are, by analogy, also applicable to the other embodiment.

Figure 4A:
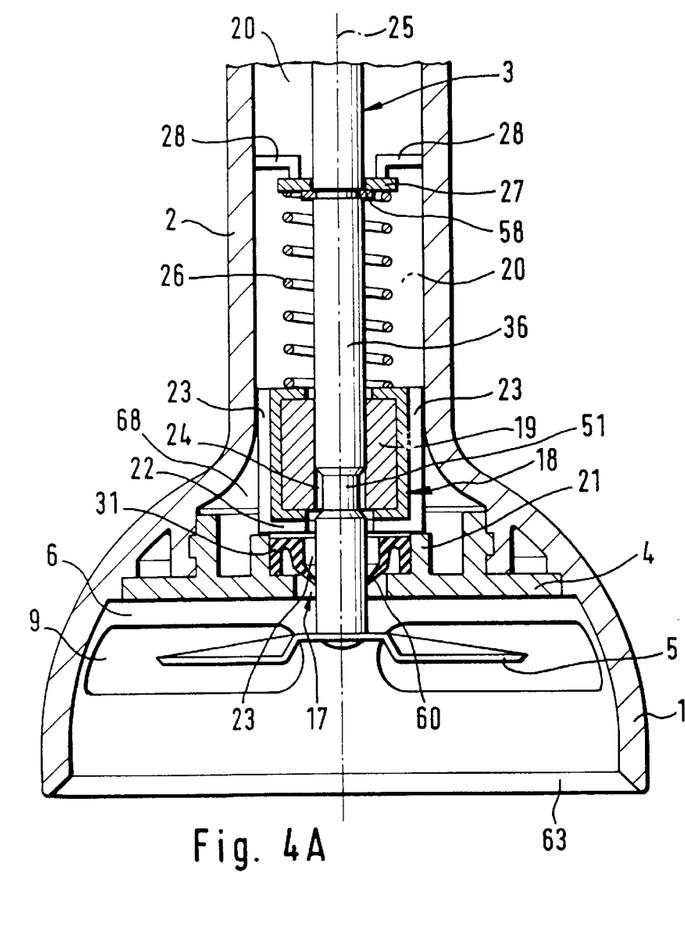
FIG. 4A is a longitudinal sectional view, on an enlarged scale, of a hand blender of the first invention illustrating a further embodiment, showing the area of its lower end, with a valve controllable by the working shaft and configured as part of the bearing of the working shaft, the valve being shown in a closed position in which a pressure below atmospheric is produced in the chamber of the bell-shaped casing by the cutter blade when in operation.
Figure 4B:
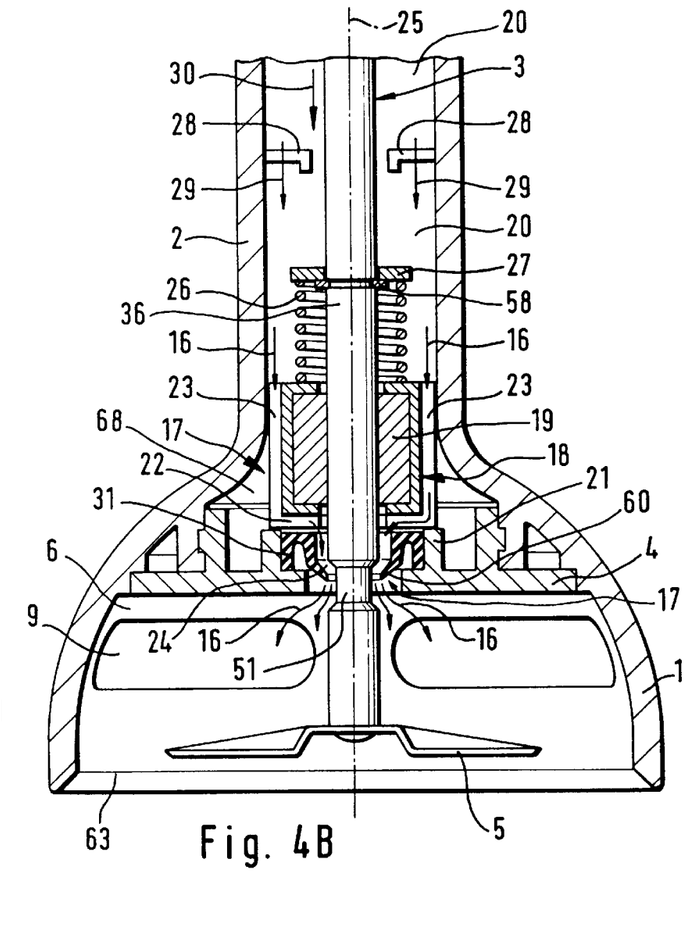
FIG. 4B is a view similar to FIG. 4A but showing the valve in an open position caused by axial displacement of the working shaft.

In the embodiment of the hand blender as illustrated in FIGS. 4A and 4B, a valve generally designated by reference numeral 17 is formed in the area of a bearing 18 and utilizing the working shaft 3. Such a bearing 18 serves to rotatably support the working shaft 3 in the lower part of the shaft housing 2 or in the area of the cover plate 4. Bearing parts 19 of the bearing 18 are inserted between the annular chamber 20 and the upper chamber 68 and are held both on the shaft housing 2 and on the working shaft 3. On its side close to the cutter blade 5, the cover plate 4 includes a bearing mount 21 in which a ring seal 31 is clampingly held. Adjoining the bearing parts 19 are flow channels 22 extending radially above the bearing mount 21, while axially extending flow channels 23 are formed in the bearing part upper area abutting the inner wall of the shaft housing 2. Moreover, the working shaft 3 has a circumferential groove 51 which is completely embraced by the bearing parts 19 in an initial position as illustrated in FIG. 4A.

A spiral spring 26 bearing with one end against the upper end of the bearing parts 19 and with its other end against a driver plate 27 holds the working shaft 3, which is slidably guided in the direction of the axis 25, in the initial position of FIG. 4A. In the initial position shown in FIG. 4A in which the hand blender is not in operation, the driver plate 27 which is connected in axially non-displaceable manner with the working shaft 3 through a circlip 58 engaging the working shaft 3, rests against an abutment 28 extending radially inwardly from the shaft housing 2, but in such a way that flow channels or flow passageways 29 remain between the abutment 28 and the outer circumference of the working shaft 3, so that the abutments 28 are therefore configured as bars.

With the hand blender in operation, that is, with the cutter blade 5 set in rotation by the working shaft 3, the working shaft 3 can be displaced axially downwardly as indicated by the arrow 30 in FIG. 4B and as appears readily from the lowered position of the cutter blade 5, by rotating an adjusting device 37, 38 (FIG. 5) and 41, 42 (FIGS. 9A, 9B), as a result of which the groove 51 is displaced downwards a corresponding amount and enters the sealing lip 60 which is then out of engagement with the wall of the groove 51, thus establishing a connection between the flow channel 24 and the lower chamber 6. This enables air to enter in accordance with the flow arrows 16 through the interior of the shaft housing 2, the passageway 29 between the abutment 28 and the working shaft 3, the axially extending flow channel 23, the radially extending flow channel 22 and again the axially extending flow channel 24 into the lower chamber 6 of the bell-shaped casing 1.

In order to be able to terminate the supply of air into the chamber 6 subsequently, the working shaft 3 is displaced again by means of the adjusting device 37, 38 or 41, 42 upwardly into the position illustrated in FIG. 4A under the force of the spiral spring 26 compressed in FIG. 4B, so that the axially extending flow channel 24 between the working shaft 3 and the seal 31 fastened to the cover plate 4 is closed off by the sealing lip 60 and the groove 51 enters again the bearing part 19. In this process, the sealing lip 60 engages again the lower end of the working shaft 3, effecting a seal (FIG. 4A). The displacement of the working shaft 3 in the direction of the arrow 30 can be accomplished manually or in dependence on the rotational frequency. Arrangements serving this purpose are illustrated in FIGS. 5 and 6.

Figure 5:
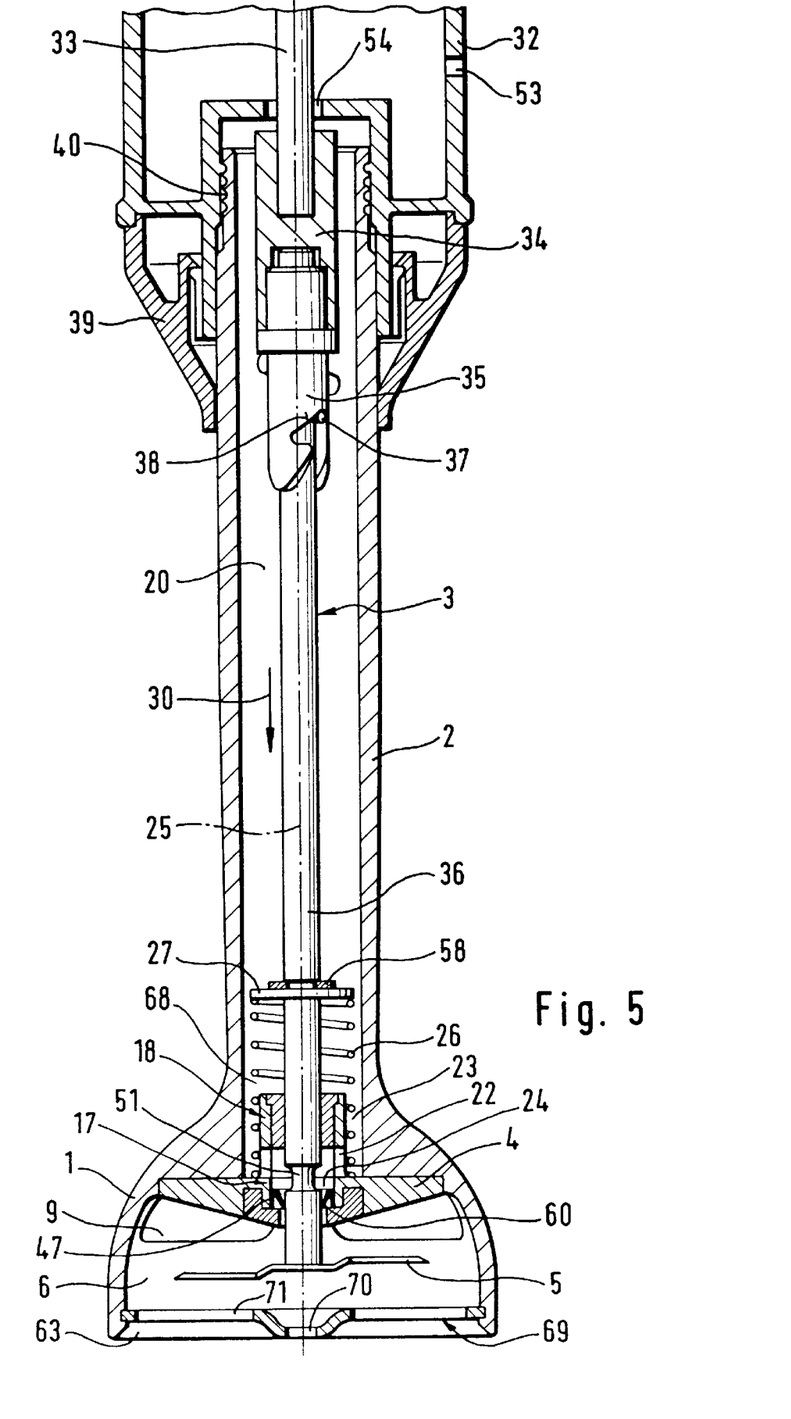
FIG. 5 is a view of a further embodiment of a hand blender with bell-shaped casing, shaft housing and part of the motor housing, including an adjusting device for the valve.
Figure 6:
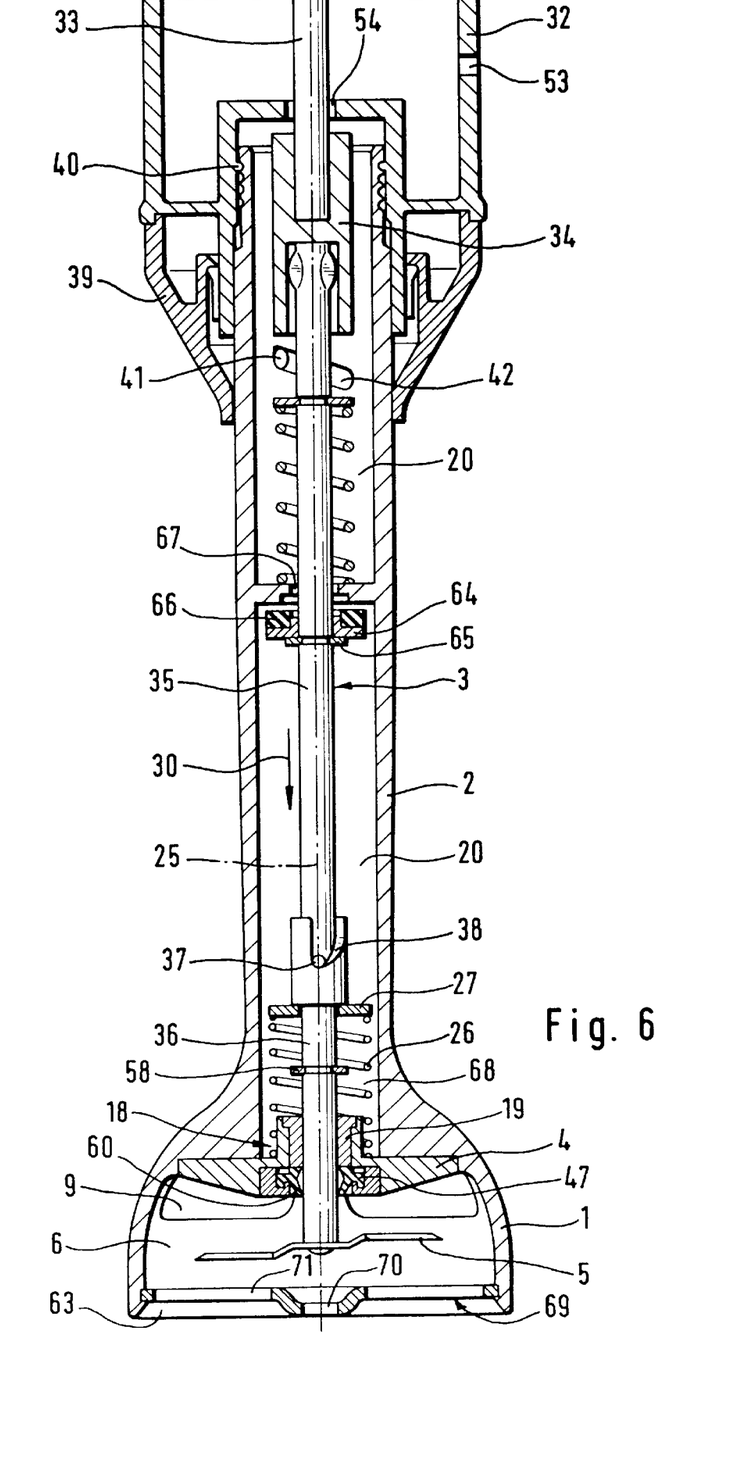
FIG. 6 is a view of an arrangement comparable to FIG. 5 but modified relative to the embodiment of FIG. 5 in respect of the adjusting device.

The hand blender as illustrated in a sectional view in FIG. 5 is comparable to the embodiment of FIGS. 4 as regards the bell-shaped casing 1 and the configuration of the flow channels 20, 22, 24, 6, with the exception however that the bearing 18 is arranged directly in the cover plate 4. Also in this embodiment, the working shaft 3 has a circumferential groove 51 which, starting from an initial position as illustrated in FIG. 5, opens a flow channel 24 between the working shaft 3 and the ring seal 47 when the working shaft 3 is displaced downwards in the direction of the arrow 30. Secured to the upper end of the shaft housing 2 is a motor housing 32 receiving a motor, not shown, whose output shaft 33 of which only a fragment is shown engages a drive coupling 34 in a manner preventing relative rotation. The motor housing 32 is releasably attached to the end of the shaft housing 2 and can be removed therefrom, for example, in order to clean the lower part 2 of the hand blender following use.

Immediately beneath the output shaft 33, the working shaft 3 of FIG. 5 is subdivided into an upper working shaft part 35 and a lower working shaft part 36. The upper working shaft part 35 is a sleeve connected in a non-rotating relationship with the drive coupling 34 into which the lower working shaft part 36 is slid. The lower working shaft part 36 includes a radially extending pin 37 which engages a cam surface 38 of the working shaft part 35 formed in the area of the lower end of the sleeve-shaped upper working shaft part 35. This cam surface 38 extends in spiral shape, so that a rotating motion of the lower working shaft part 36 relative to the upper working shaft part 35 causes the pin 37 to be guided along the cam surface 38 whereby the lower working shaft part 36 is displaced downwards in the direction of the arrow 30. Starting from a position as illustrated in FIG. 5 and, by way of example, also in FIG. 4A, the working shaft 3 is moved to a downwardly displaced position as shown in FIG. 4B.

The instant of displacement can be adjusted and/or varied by means of the spiral spring 26 illustrated in FIG. 5 and corresponding in its effect to the spiral spring 26 of the embodiment of FIGS. 4A and 4B, in dependence upon the rotational frequency and the forces exerted on the pin 37 via the cam surface 38. With the rotational frequency increasing, the force component acting via the cam surface 38 on the pin 37 in the direction of the arrow 30 is also increased, so that the desired displacement of the lower working shaft part 36 relative to the upper working shaft part 35 is accomplished. With the rotational frequency diminishing, the spiral spring 26 then acts to displace the lower working shaft part 36 upwards into the sleeve-shaped working shaft part 35, so that the groove 51 opening the flow channel is displaced into a region in which the flow channel 24 as explained with reference to FIGS. 4A and 4B is closed. When the flow channel 24 establishes communication between the lower chamber 6 and the upper chamber 68, air is aspirated through the opening 53 and the bore 54 into the annular chamber 20, the air then flowing into the lower chamber 6, reducing or eliminating the pressure below atmospheric in this chamber.

While FIG. 5 shows one pin 37 and one cam surface 38 only, it will be understood that several such pins 37 engaging each a corresponding cam surface 38 and spaced radially on the circumference of the working shaft 3 may be provided to distribute the occurring forces uniformly on the circumference of the working shaft 3.

Figure 7A:
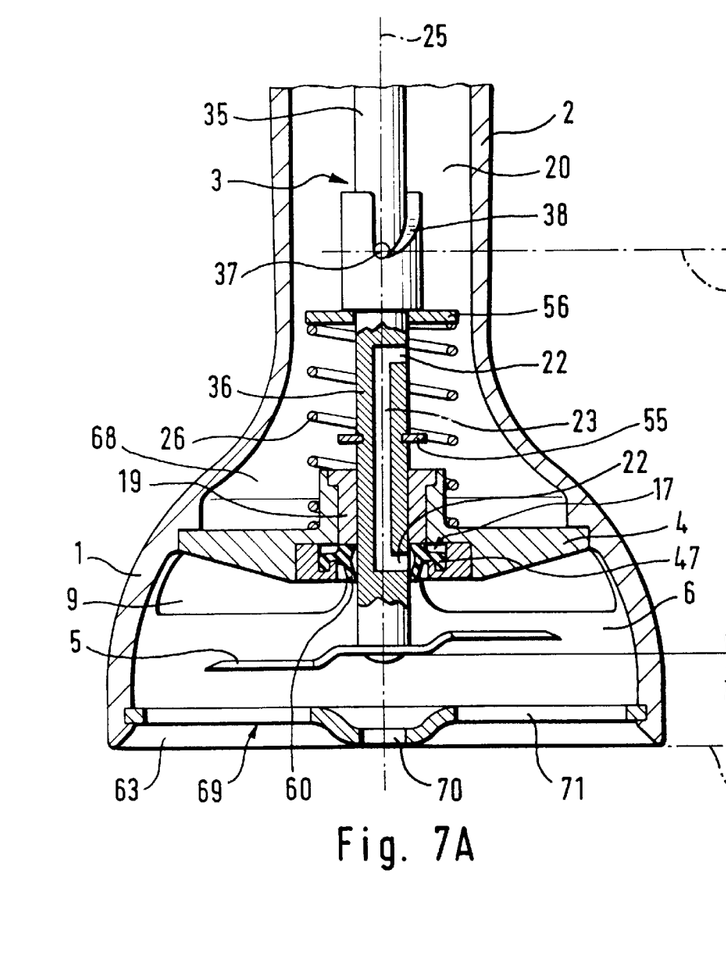
FIGS. 7A, 8A and 7B, 8B are views, on an enlarged scale, of the lower end of a hand blender comparable to the hand blender structure of FIG. 6, illustrating it in various operating positions.
Figure 7B:
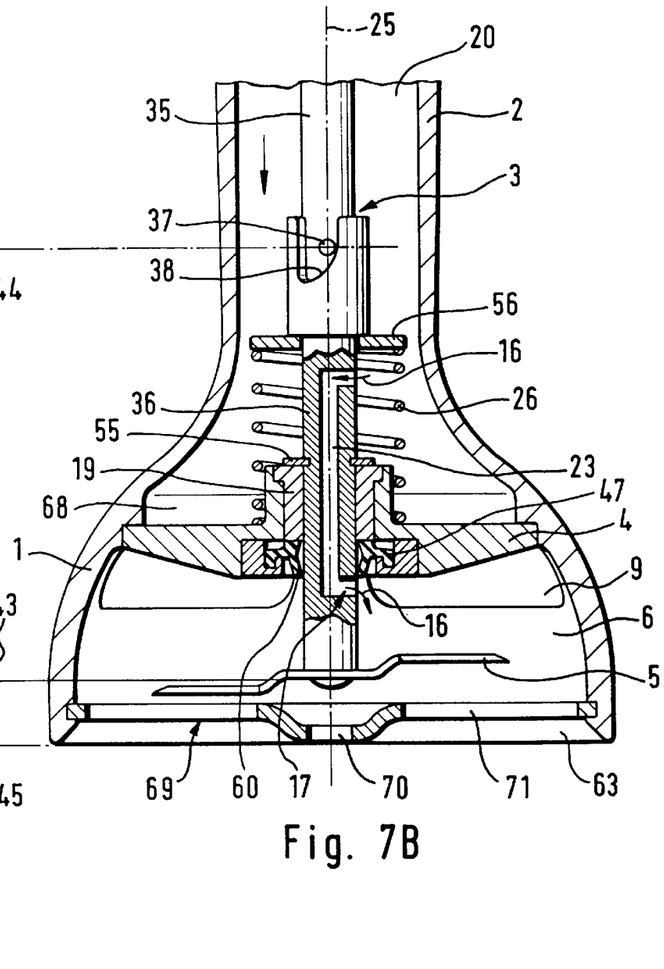
Figure 9A:
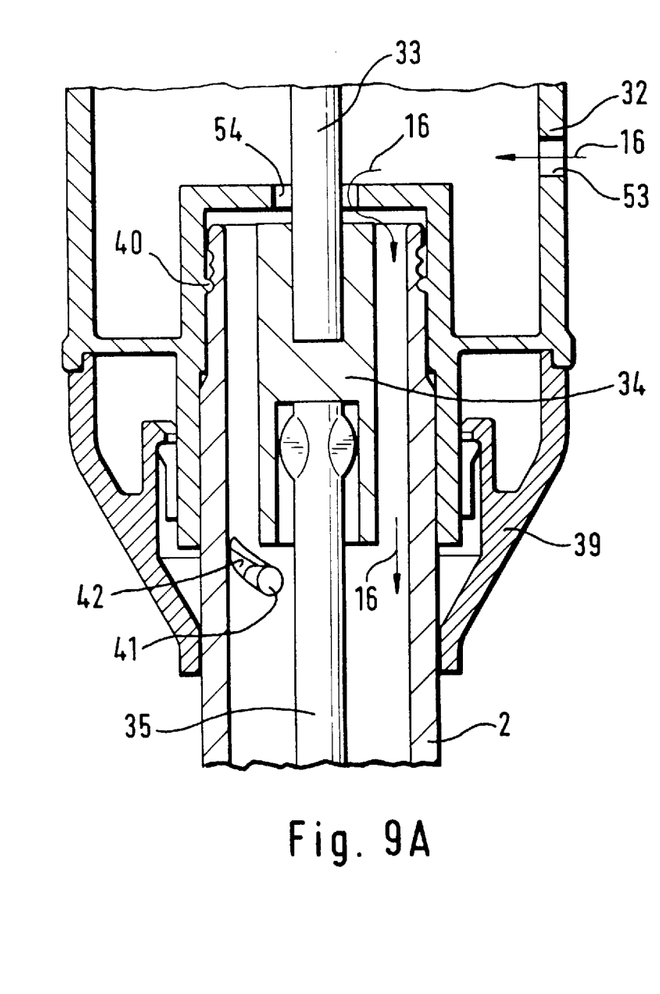
FIGS. 9A, 9B are views, on an enlarged scale, of the upper end of a hand blender comparable to the embodiment of FIG. 6 to explain the various adjustable open positions of the valve in such a hand blender.
Figure 9B:
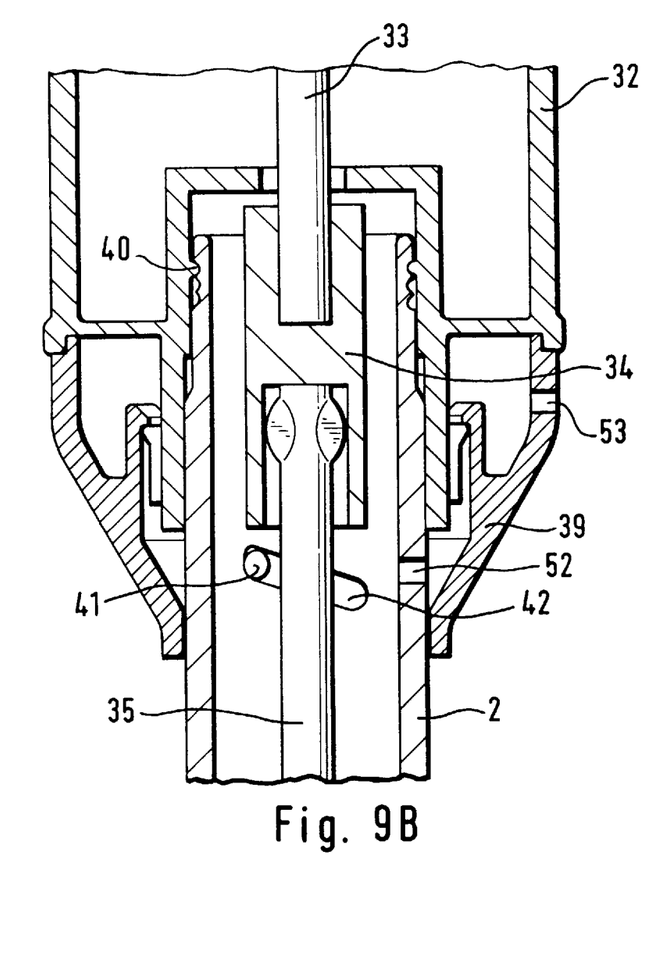

The embodiment of FIGS. 6, 7A and 7B shows an alternative to the embodiment of FIG. 5, with the division of the working shaft 3 being made in the lower section of the shaft housing 2. In addition, in this embodiment the sleeve-shaped working shaft part is the lower working shaft part 36 having a cam surface 38 corresponding to the embodiment of FIG. 5, while the upper working shaft part 35 is guided in the sleeve and includes one or several pins 37 engaging one or several cam surfaces 38. In this arrangement of FIG. 6, the motor housing 32 is held slidable relative to the shaft housing 2 or a housing receiving structure 39 fastened to the end of the shaft housing 2. For this purpose, a thread 40 is provided at the end of the shaft housing 2 as well as on the inside of the section of the motor housing 32 receiving the shaft housing. A rotating motion of the shaft housing 2 relative to the motor housing 32 causes displacement of a cam pin 41 non-rotatably associated with the housing receiving structure 39 within a slanting slot 42, as becomes apparent from a comparison of FIG. 9A showing an initial position as shown in FIG. 6, with FIG. 9B.

FIGS. 7A and 7B show the lower part of the shaft housing 2 with the adjoining bell-shaped casing 1, the connection between the upper working shaft part 35 and the lower working shaft part 36 corresponding to the configuration of FIG. 6. FIGS. 7A and 7B show a flow channel which is composed of an upper and a lower radial flow channel 22 and an axial flow channel 23. FIG. 7A illustrates a position in which the flow channels 22, 23 are not in communication with the chamber 6 beneath the cover plate 4, while FIG. 7B shows a position in which the lower working shaft part 36 is displaced by a length of travel 43 corresponding to the displacement of the cam surface 38 along the pin 37. Line 44 serves for orientation, indicating the axial orientation of the pin 37 to show that only the lower working shaft part 36 is displaced downwardly.

In contrast to the embodiment of FIGS. 4A and 4B, the axial channel 23 extends in the interior of the lower working shaft part 36 and has its upper and lower end in communication with a respective radial flow channel 22. With the hand blender in a position of rest in which the spiral spring 26 urges the lower working shaft part 36 upwardly, the lower radial flow channel 22 is closed off by the seal 47, while in the lower position shown in FIG. 7B this lower radial flow channel 22 is opened by the sealing lip 60, thus establishing fluid communication between the chamber 6 of the bell-shaped casing 1 and the shaft housing 2. Because in this position a valve plate 64 with a ring seal 66 secured axially on the working shaft 3 by means of a circlip 65 opens a bore 67, a connection to atmosphere is established through the bore 54 and the opening 53 (FIG. 6), and this, however, only if in addition the shaft housing 2 is rotated such as to be turned into the motor housing 32 by the cam-pin-and-slot connection 41, 42 such an amount that also the second valve 66, 67 opens, as illustrated in FIG. 6. Accurate metering of the pressure below atmospheric in the lower chamber 6 is thereby possible. Air can be fed to the lower chamber 6 in the open position of the valves 22, 60 and 66, 67.

Figure 8A:
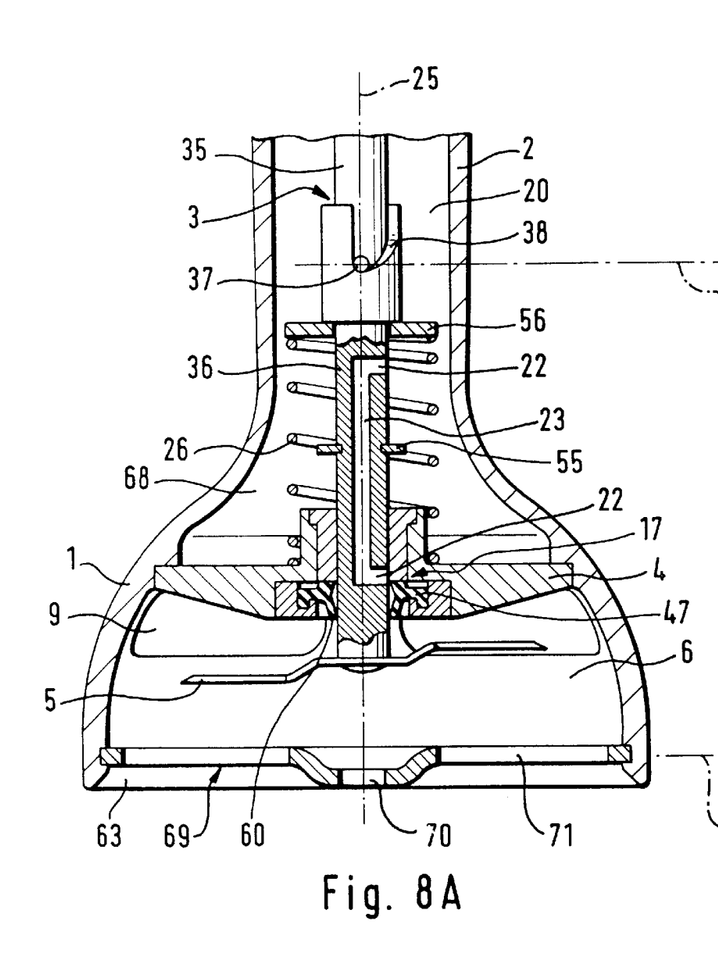
Figure 8B:
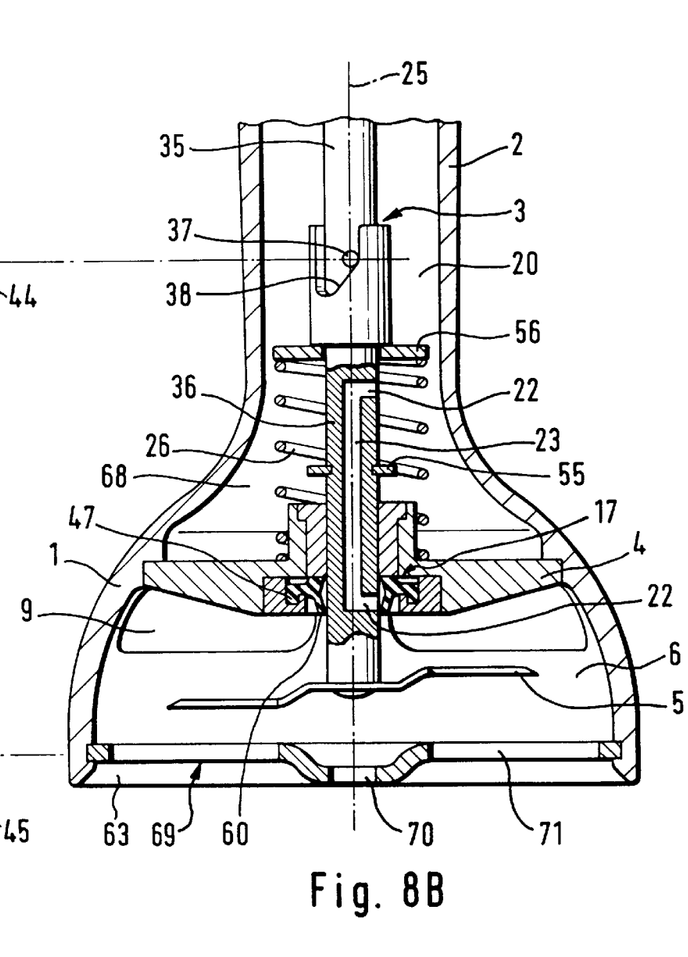

FIGS. 8A and 8B illustrate arrangements comparable to those of the FIGS. 7A and 7B, respectively, showing positions in which the lower working shaft part 36 is not displaced downwardly (position of rest, hand blender not in operation, FIG. 8A), and, respectively, in which the lower working shaft part 36 is displaced downwardly (hand blender in operation, FIG. 8B). However, in the arrangement of FIGS. 8A and 8B the shaft housing 2 is rotated relative to the motor housing 32 by means of the thread 40 downwardly into a position as illustrated in FIG. 9A. By reason of this rotation, the shaft housing 2 is extended in length downwards, as a comparison of the common line of orientation 45 of FIGS. 7 and 8 shows. As a result of this extension of the shaft housing 2 relative to the motor housing 32 in downward direction and starting from a position as illustrated in FIG. 8A, the lower radial flow channel 22 is not opened in spite of the downward displacement of the lower working shaft part 36, that is, it remains covered by the bearing part 19 in the downwardly displaced position of the working shaft part 36.

On account of the rotation of the shaft housing 2 relative to the motor housing 32, it can be accomplished that in operation of the hand blender the flow channel is not opened by opening of the valve, so that a hand blender configured in this manner can be operated in conventional manner without air being fed into the lower chamber 6 of the bell-shaped casing 1 (FIGS. 8A and 8B). The bell-shaped casing 1 has the lower end of its chamber 6 covered by a circular disk 69 provided with radially extending slots 71 for the aspiration of food materials and a bore 70 in its center. This disk 69 prevents a user's hand from reaching inside inadvertently, thus avoiding injuries by the cutter blade 5. At the same time, food materials enter the bell-shaped casing 1 through the slots 71 and the bore 70 unless it is closed by the base of a processing container 7 (FIG. 2).

Figure 10:
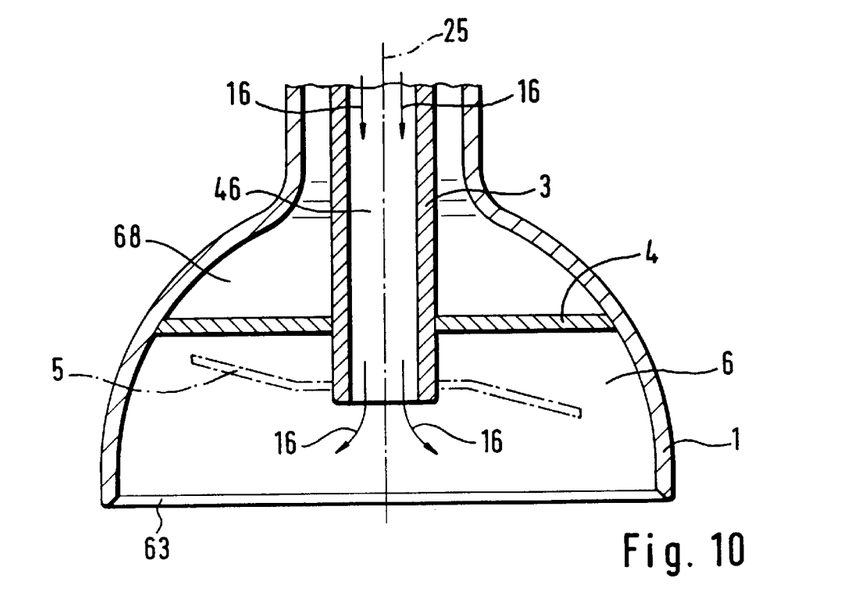
FIG. 10 is a sectional view of a further embodiment of a hand blender in the area of the bell-shaped casing, with a flow channel extending through the working shaft, but without a valve.

FIG. 10 shows schematically an embodiment in which the working shaft 3 is configured as a hollow shaft. In this embodiment, air is fed through the interior 46 of the hollow shaft to the lower chamber 6 of the bell-shaped casing 1 in order to cancel the pressure below atmospheric developing therein. A valve of the type illustrated in FIG. 1, for example, may be fitted in this flow channel 46.

Figure 11:
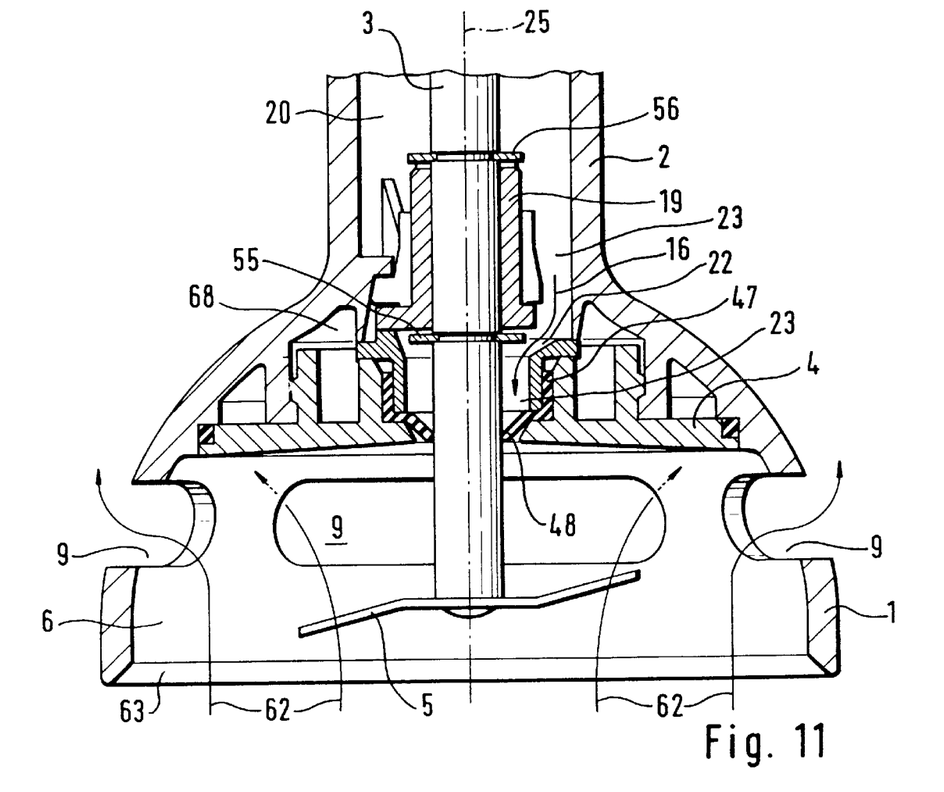
FIG. 11 is a longitudinal sectional view of a bell-shaped casing illustrating a further embodiment of a valve in the closed position and on an enlarged scale.

FIG. 11 shows a modification in which a ring seal 47 engaging the working shaft 3 is disposed above the cover plate 4, the ring seal closing off a flow channel 22, 23 along the flow indicated by the arrows 16. With a pressure below atmospheric developing in the chamber 6 of the bell-shaped casing 1, the sealing lip 48 of the ring seal 47 is resiliently moved away from the working shaft 3, opening the flow channel 22, 23 to the lower chamber 6. As the pressure below atmospheric diminishes, this ring seal 47 engages again the working shaft 3, thus reducing the supply of air and interrupting it eventually. The flow arrows 62 indicate approximately the course of flow of the food materials in operation of the hand blender, the food being drawn in through the aperture 63 by the cutter blade 5 and being expelled outwardly into the container (not shown) through the lateral slots 9 in the bell-shaped casing 1 following comminution and blending. In this embodiment, the bearing part 19 is secured axially and radially on the working shaft 3 between the circlips 55, 56.

Figure 12:
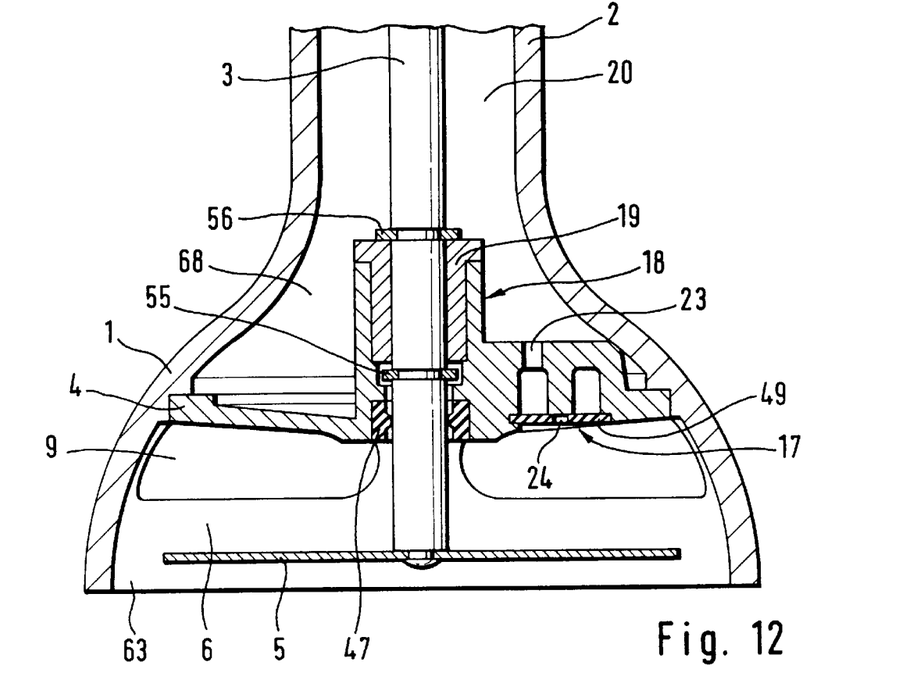
FIG. 12 is a longitudinal sectional view of a bell-shaped casing illustrating a still further embodiment of a valve in the closed position and on an enlarged scale.
Figure 13:
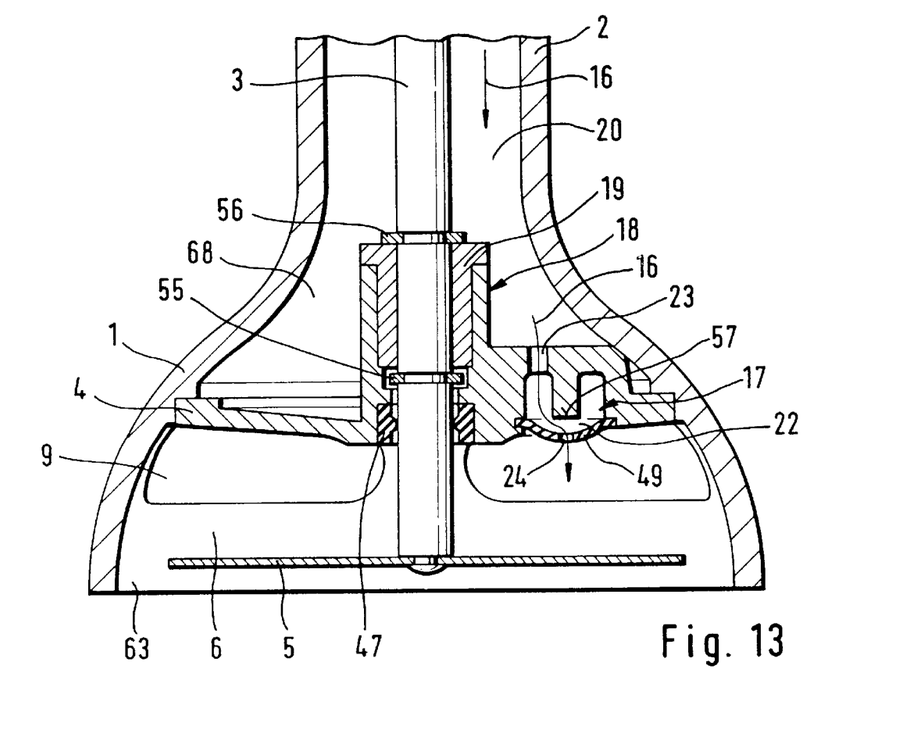
FIG. 13 is a view as in FIG. 12 but showing the valve in the open position.

FIGS. 12 and 13 illustrate a further embodiment of a valve arrangement 17 in the bell-shaped casing 1 of a hand blender, the valve arrangement being comprised of a flap valve with a diaphragm 49 having a bore 24. In the area of the bore 24, the cover plate 4 has a sealing surface 57 sealingly closing off the bore 24 in FIG. 12. In this embodiment, therefore, the valve arrangement 17 is not disposed centrally on the working shaft 3, but laterally on the cover plate 4. As soon as a vacuum develops in the lower chamber 6, the diaphragm 49 lifts itself clear of its sealing seat 57 (FIG. 13), and air is admitted into the lower chamber 6 through the annular chamber 20, the flow channels 23, 22 formed in the cover plate 4, and the bore 24.

Figure 14:
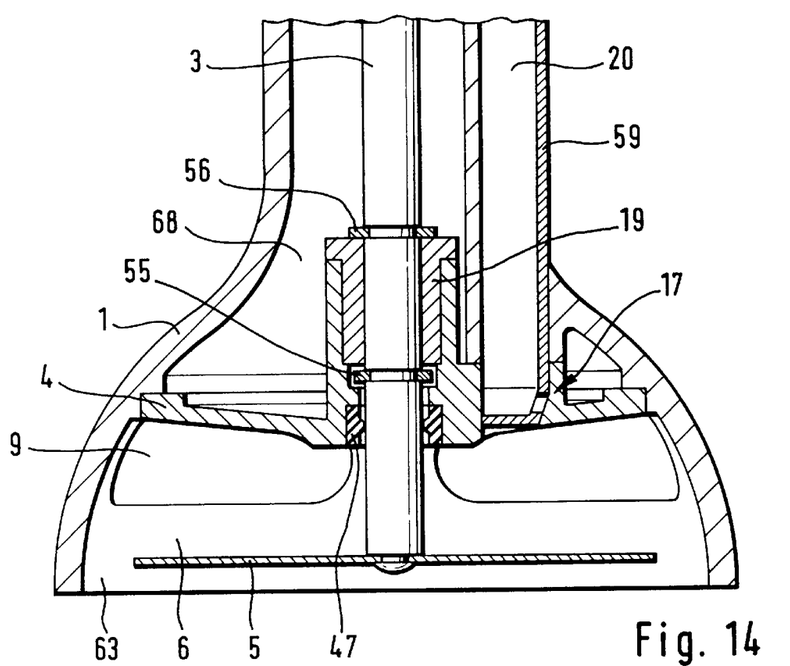
FIG. 14 is a longitudinal sectional view of a bell-shaped casing illustrating another embodiment of a valve in the closed position and on an enlarged scale.
Figure 15:
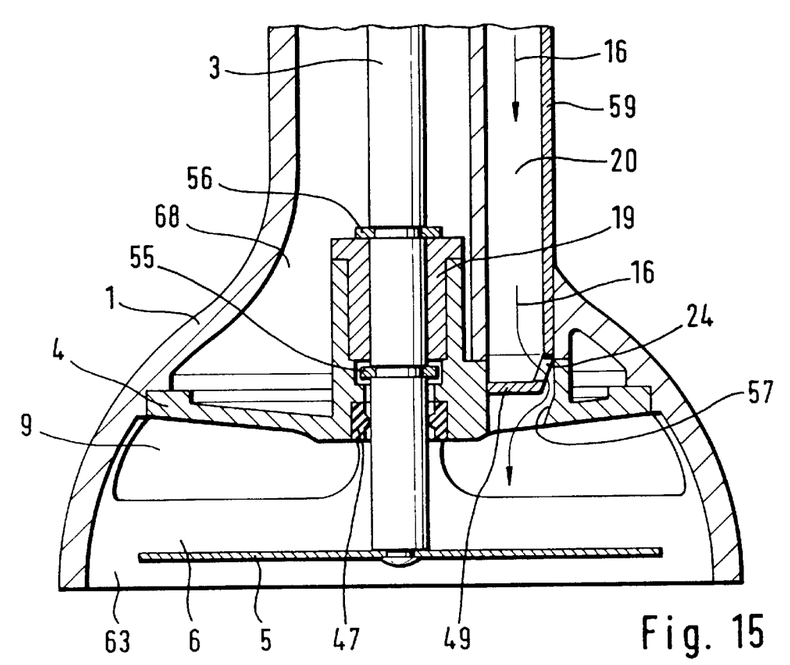
FIG. 15 is a view as in FIG. 14 but showing the valve in the open position.

The same applies to the hand blender of FIGS. 14 and 15 in which the valve 17 is equally formed by a diaphragm 49 with a bore 24 which in this embodiment, however, does not extend in the longitudinal direction of the working shaft 3 but transversely thereto and cooperates with a sealing surface 57 provided laterally on the cover plate 4. At its upper free end the diaphragm 49 is connected with a sliding member 59 which is axially guided in the shaft housing 2 by means of guiding devices not illustrated in greater detail in the drawing. This valve arrangement 17 opens only when the sliding member 59 of FIG. 15 is moved upwardly, whereby the bore 24, that is, the flow channel, unseats itself from the sealing surface 57.

In the embodiments described in the foregoing with reference to the Figures, various configurations are explained which are aimed to introduce air into the lower chamber 6 of the bell-shaped casing 1. Further, the possibility is shown to bring a hand blender into an operating position in which any supply of air is inhibited completely. It will be understood that the latter approach can also be implemented in combination with further different valve arrangements.

What is claimed is:

1. A hand blender powered by an electric motor, for mixing or comminuting foodstuffs in a container, the hand blender comprising:
   a working shaft having an output end;
   a processing tool which is attached to the output end of the working shaft;
   a shaft housing which carries the working shaft;
   a bell-shaped casing having a lower chamber which encloses the processing tool, a lower end bounded by an aperture, and a plurality of lateral openings for the discharge of foodstuffs;
   a cover plate within the bell-shaped casing forming a fluid-tight seal between the lower chamber and an inner chamber of the shaft housing; and
   an air supply structure through which outside air is supplied to the lower chamber of the bell-shaped casing when the bell-shaped casing is immersed in the foodstuffs, said air supply structure including a flow channel having an inlet side which communicates with the outside air and an outlet side which communicates with the lower chamber (6) of the bell-shaped casing.

2. The hand blender as claimed in claim 1 wherein the air supply structure includes a fan device.

3. The hand blender as claimed in claim 1, wherein the air supply structure produces in at least a partial area of the lower chamber of the bell-shaped casing a pressure below atmospheric by rotation of the processing tool when the bell-shaped casing is immersed in the foodstuffs.

4. The hand blender as claimed in claim 1, wherein the flow channel includes a narrow portion to maintain during operation pressure in the lower chamber within specified limits.

5. The hand blender as claimed in claim 1, wherein the flow channel extends from the bell-shaped casing, proceeds through an annular chamber within the shaft housing, through a plurality of openings provided on a motor housing, to atmosphere.

6. The hand blender as claimed in claim 1, wherein the working shaft is a hollow shaft, the interior of which defines at least part of the flow channel.

7. The hand blender as claimed in claim 1, wherein the processing tool is a cutter blade.

8. The hand blender as claimed in claim 1, including a valve having a closable valve member, said valve being arranged in the flow channel.

9. The hand blender as claimed in claim 8, wherein the valve opens a greater or lesser amount in dependence upon operation of the hand blender.

10. The hand blender as claimed in claim 8, wherein the valve is arranged in the cover plate within the bell-shaped casing.

11. The hand blender as claimed in claim 8, wherein the valve member is axially slidable relative to the working shaft.

12. The hand blender as claimed in claim 11, wherein the valve member includes a slidable part of the working shaft, the valve member being arranged between the bell-shaped casing and the shaft housing.

13. The hand blender as claimed in claim 11, wherein the valve member includes a bearing supporting the working shaft, the valve member being arranged between the bell-shaped casing and the shaft housing.

14. The hand blender as claimed in claim 8, wherein the valve member is radially slidable relative to the working shaft.

15. The hand blender as claimed in claim 11 or 14, wherein the valve member includes a ball and a spring pushing against the ball, wherein the ball in a rest position closes the flow channel.

16. The hand blender as claimed in claim 11, wherein the valve member includes a slidable part of the working shaft and a bearing supporting the working shaft, the valve member being arranged between the bell-shaped casing and the shaft housing.

17. The hand blender as claimed in claim 16, wherein the working shaft includes two parts, the two parts being connected with each other by a first coupling member and a second coupling member wherein the coupling members possess interengaging guide members which on a radial rotating motion of the two parts relative to each other effect an axial displacement of the working shaft and open the flow channel.

18. The hand blender as claimed in claim 17, wherein the guide members are defined by at least one projection on the first coupling member and by at least one cam surface on the second coupling member.

19. The hand blender as claimed in claim 17, wherein the two parts of the working shaft are slidably arranged in opposition to the force of a spring holding the two parts in a position of rest.

20. The hand blender as claimed in claim 16, wherein an outer surface of the valve member defines a groove which cooperates with a fixed ring seal to provide the valve.

21. The hand blender as claimed in claim 16, wherein the shaft housing is rotatable relative to an adjacent housing, with the valve closing an opening in a first position and the valve releasing the opening in a second position.

22. The hand blender as claimed in claim 21, wherein the valve is a flap valve which includes a diaphragm with an opening, said opening being closed in said first position by a sealing surface arranged fast with the housing.

23. The hand blender as claimed in claim 22, including a sliding member provided on the diaphragm.

24. The hand blender as claimed in claim 8, wherein the valve member is includes a ring seal having a flexible sealing lip which lifts clear of the working shaft resiliently in the presence of a pressure below atmospheric in the lower chamber.

* * * * *